United States Patent Office 2,800,002
Patented July 23, 1957

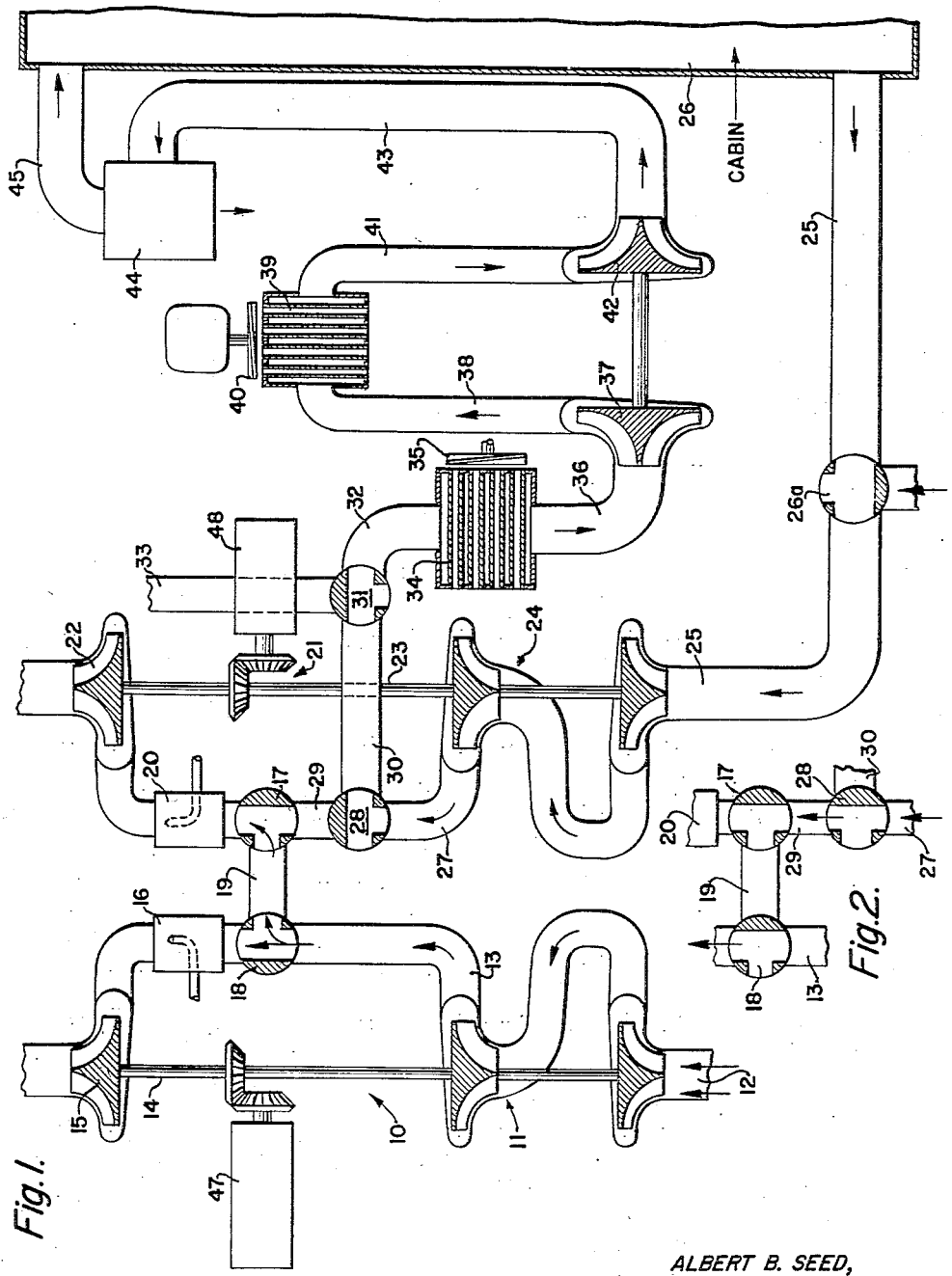

2,800,002
CABIN REFRIGERATION SYSTEM

Albert B. Seed, Los Angeles, Calif., assignor to The Garrett Corporation, Los Angeles, Calif., a corporation of California Application February 2, 1954, Serial No. 407,768

6 Claims. (Cl. 62—136)

This invention relates to a closed cycle refrigeration system for cooling an aircraft cabin when on the ground, and more particularly to such a system operated in connection with gas turbine compressor equipment.

Refrigeration or cooling of aircraft cabins when on the ground is particularly desirable under conditions where the aircraft, prior to take-off, is resting on a field under high temperature conditions normally prevalent during hot summer days.

Aircraft cabin ground cooling has conventionally been accomplished by portable refrigeration equipment separate from the aircraft and also by equipment carried in the aircraft. Such equipment frequently has been relatively bulky due to the large cooling capacity required thereof. Conventional ground cooling devices refrigerate ambient air and force it through the aircraft cabin. Such air normally contains some moisture which requires considerably more refrigeration than does dry air. For this reason aircraft cabin cooling devices have been designed with sufficient thermal capacity to compensate for the moisture in the air which has heretofore been refrigerated and then dumped overboard after passing through the aircraft cabin. The main disadvantage of such a mode of operation resides in the fact that refrigeration is wasted on the moisture in the air which is dumped overboard rather than being fully utilized for the cooling of the aircraft cabin.

According to the present invention an unoccupied aircraft cabin forms a portion of a closed cycle refrigeration system including a water trap for initially removing moisture from the air in the system whereafter the dry air is recirculated through the cabin. This arrangement involves a minimum overall bulk in the refrigeration system to accomplish aircraft cabin ground cooling. The system constructed according to the present invention produces more refrigeration, useful in cooling the aircraft cabin, because its cooling capacity is devoted entirely thereto rather than being wasted on the moisture in the ambient air which, in conventional systems, merely passes through the cabin to atmosphere. Due to the removal of moisture from the air recirculated in the cabin, low temperatures can be reached more quickly, and as a result the aircraft cabin may be cooled in a very short time. With a reduction in cabin outlet temperature the efficiency of the compressor, driving the refrigeration system, increases.

The present system is operated in combination with dual purpose gas turbine compressor means, whereby it may be utilized under a variety of conditions and therefore does not require its own individual prime mover or a separate source of compressed air.

It is an object of the invention to provide a closed cycle refrigeration system for cooling aircraft cabins, when on the ground, in which great refrigeration capacity is available in proportion to the bulk and complexity of the system.

Another object of the invention is to provide a refrigeration system which is particularly adapted to the cooling of aircraft cabins when on the ground preliminary to take-off.

Another object of the invention is to provide a refrigeration system of the closed air cycle type including a dehumidifier whereby moisture is removed from the refrigerated air permitting substantially the entire refrigeration capacity of the system to be devoted to cabin cooling.

A further object of the invention is to provide an aircraft cabin refrigeration system which is particularly adapted to co-operate with a gas turbine compressor arrangement wherein two turbines operate or drive two compressors, one of which furnishes combustion air to both turbines, while the other compressor provides compressed air to operate the refrigeration system.

A still further object of the invention is to provide a novel utilitarian arrangement of a closed cycle refrigeration system and a gas turbine compressor wherein the gas turbine compressor provides compressed air to operate a refrigeration system and may also be used to furnish additional pneumatic or shaft power.

Other objects and advantages of the invention will be apparent from the following specification, claims, and drawing forming a part of this application, in which:

Fig. 1 is a diagrammatic view of a closed cycle refrigeration system for cooling aircraft cabins when on the ground; and Fig. 2 is a fragmentary view showing an alternative position of valves included in the system of Fig. 1.

As shown in Fig. 1 of the drawing a gas turbine compressor 10 is provided with a two-stage compressor 11 having an inlet 12 and an outlet 13. A shaft 14 connects the compressor 11 with a gas turbine wheel 15 which receives combustion gas from a combustor 16. A selector valve 18 is adapted to divide flow of air from the compressor outlet 13 into the combustor 16 and into a conduit 19 which communicates through a selector valve 17 with a combustor 20 of a secondary gas turbine compressor 21. The gas turbine compressor 21 is provided with a turbine wheel 22 adapted to receive combustion gas from the combustor 20. Coupled to the turbine wheel 22 by means of a shaft 23 is a two-stage compressor 24 having an inlet conduit 25 communicating with the interior of the aircraft cabin 26. A selector valve 26a in the conduit 25 permits the inlet of the compressor 24 to communicate with either the cabin 26 or ambient atmosphere as desired. Interposed between the second stage outlet 27 of the two-stage compressor 24 and the combustor 20 is a selector valve 28. Communicating with the selector valve 28 are conduits 29 and 30 which provide for conduction of compressed air from the compressor 24 to the combustor 20, or to the conduit 30 communicating with the refrigeration assembly, which will be hereinafter described in detail. Communicating with the conduit 30 is a selector valve 31 adapted to direct compressed air into a conduit 32 communicating with the refrigeration assembly or to a conduit 33 which is adapted to conduct bleed air from the compressor 24. The conduit 32 communicates with a heat exchanger 34 adapted to cool compressed air entering the same from the conduit 32. A fan 35 is provided to circulate ambient air or other cooling fluid through the heat exchanger 34. A conduit 36 is provided at the outlet of the heat exchanger 34 to receive cooled compressed air. The conduit 36 communicates with the inlet of an air cycle refrigeration compressor 37 having an outlet conduit 38 communicating with a secondary heat exchanger 39 which is supplied with cooling ambient air or the like by means of a fan 40. Air admitted to the heat exchanger 39 by means of the conduit 38 passes therefrom through a conduit 41 which communicates with the periphery of an expansion turbine 42 which expands and thereby cools compressed air entering through the conduit 41. The expanded and cooled air is exhausted from the expansion turbine 42 into a conduit 43 which conducts it to a water separator 44 having an air outlet conduit 45. Dehumidified air passing from the water separator 44 is conducted into the cabin 26 through the conduit 45. The cabin 26 is closed except for its communication with the conduits 25 and 45 which are arranged to provide for recirculation of dehumidified air through the cabin and refrigeration system.

The operation of the closed cycle refrigeration system for cooling aircraft cabins when on the ground, according to the present invention, is substantially as follows.

When the present refrigeration system is employed in connection with an aircraft cabin and when it is desired to cool the same on the ground preliminary to take-off, all access doors and openings in the cabin are closed except for the refrigeration system conduits 25 and 45. During operation of the refrigeration system substantially all of the moisture is removed from the air in the form of fog or ice particles discharged by the turbine and coalesced and collected by the water separator 44. This desiccation is permissible since the aircraft usually does not have human occupants during the standby period when the ground cooling operation is being conducted. Dry refrigerated air enters the cabin through the conduit 45 and is exhausted therefrom into the conduit 25 which conducts it to the inlet of the compressor 24. The air is directed through the selector valves 28 and 31, heat exchanger 34, compressor 37, conduit 38, heat exchanger 39, conduit 41, through the expansion turbine 42, which further cools the air and delivers it through the conduit 43 to the water separator 44 which, during a few recirculation cycles, removes substantially all of the moisture from the air.

As the dry dehumidified air is continuously recirculated through the refrigeration system and the cabin, substantially all of the refrigeration capacity of the system is utilized for cooling the cabin and in this manner a very compact refrigeration assembly is obtained in proportion to the amount of refrigeration delivered to the cabin. As the cabin air temperature is progressively reduced, the effectiveness of the system rapidly improves, for the reason that with moisture removed from the air, the power required to reduce its temperature is utilized in accomplishing this rather than being expended in part to cool further moisture. Thereby the temperature of the air can be dropped more rapidly, and thereby more rapid heat removal occurs from the heated parts of the aircraft. Additionally, the efficiency of the compressor 24 rapidly increases with the drop in air temperature, increasing the effective capacity of the system.

In order to maintain a compact refrigeration system and means for operating the same, an air cycle refrigeration system according to the present invention is combined with a multiple gas turbine compressor arrangement. The gas turbine means for supplying motive power to the refrigeration system may serve other purposes and thus the refrigeration system is integrated with the general airplane accessory equipment, thereby reducing to a minimum the overall bulk of a system required for ground cooling of an aircraft cabin. The gas turbine arrangement employing a gas turbine compressor 10 assisting a gas turbine compressor 21 provides for a combination of shaft power and refrigeration when the aircraft employing the same is on the ground and also provides for versatile operation of the gas turbine compressors independently of each other when the airplane has ascended from the ground. The compressor 11 of the gas turbine compressor 10 as shown in Fig. 1 furnishes compressed air to the combustors 16 and 20 of both the turbines 15 and 22. This arrangement permits all of the compressor output from the gas turbine compressor 21 to be diverted through selector valve 28 to the refrigeration system. At the same time electrical power may be taken from the shaft 14 of the gas turbine compressor by means of a shaft-driven generator 47.

As shown in Fig. 2 the selector valve 18 may be closed to the conduit 19 while the selector valve 28 may be closed to the conduit 30 permitting each of the gas turbine compressors 10 and 21 to operate independently for the purpose of supplying shaft power through the shaft 14 to the generator 47, and through the shaft 23 to the generator 48. When the valves 18 and 28 are in the position as shown in Fig. 1 and it is desired to use pneumatic power, the selector valve 31 may be closed to the condiut 32 permitting the conduit 33 to conduct compressed air to a use location. The selector valve 17 is provided to permit optional use of either of the gas turbine compressors 10 or 21 for operating the refrigeration system.

It will be understood that the use of a closed cycle refrigeration system with a gas turbine compressor provides a high capacity ground cooling arrangement for aircraft cabins which may be readily integrated with other accessory equipment providing a very lightweight compact installation having considerable versatility. It will also be understood that the system of the invention may be used for cooling other enclosures than aircraft cabins.

I claim:

1. In a closed cycle refrigeration system for cooling aircraft cabins when on the ground, a closed cabin, an air cycle refrigeration assembly having a cool air outlet communicating with the interior of said cabin, a gas turbine compressor assembly having a compressor inlet communicating with said cabin, said compressor assembly being provided with an outlet communicating with the inlet of said air cycle refrigeration assembly, means in said system for removing moisture from aid therein, said system, including said cabin and said refrigeration assembly, being closed to outside atmosphere, and a second gas turbine compressor assembly having a compressor arranged to furnish combustion supporting air to both of the gas turbine compressor assemblies, whereby the compressor of the first mentioned gas turbine assembly may be entirely devoted to operation of the refrigeration assembly.

2. In a closed cycle refrigeration system for cooling an aircraft cabin when on the ground, an air cycle refrigeration assembly having a cool air outlet for communicating with the interior of the cabin, a gas turbine compressor assembly having a compressor inlet communicating with the cabin, said compressor assembly being provided with an outlet communicating with the inlet of said air cycle refrigeration assembly, means in said system for removing moisture from air therein, a second gas turbine compressor assembly having a compressor arranged to furnish combustion supporting air to both of the gas turbine compressor assemblies, whereby the compressor of the first mentioned gas turbine assembly may be entirely devoted to operation of the refrigeration assembly, first valve means intercommunicating with the compressor of said second gas turbine compressor and with the turbine of the first gas turbine compressor, and second valve means adapted to divert compressed air from the first compressor to support combustion for operating the turbine thereof, whereby said gas turbine compressor may cooperate when providing refrigeration power or may operate independently for accomplishing other work.

3. In a closed cycle refrigeration system for cooling an aircraft cabin when on the ground, an air cycle refrigeration assembly having a cool air outlet for communicating with the interior of the cabin, a gas turbine compressor assembly having a compressor inlet communicating with the cabin, said compressor assembly being provided with an outlet communicating with the inlet of said air cycle refrigeration assembly, means in said system for removing moisture from air therein, a second gas turbine compressor assembly having a compressor arranged to furnish combustion supporting air to both of the gas turbine compressor assemblies, whereby the compressor of the first mentioned gas turbine assembly may be entirely devoted to operation of the refrigeration assembly, first valve means intercommunicating with the compressor of said second gas turbine compressor and with the turbine of the first gas turbine compressor, second valve means adapted to divert compressed air from the first compressor to support combustion for operating the turbine thereof, whereby said gas turbine compressors may co-operate when providing refrigeration power or may operate independently for accomplishing other work, and third valve means for shutting off flow from the cabin to the compressor inlet of the first gas turbine compressor, and for opening the same compressor inlet to atmosphere.

4. In a closed cycle refrigeration system for cooling an aircraft cabin when on the ground, an air cycle refrigeration assembly having a cool air outlet for communicating with the interior of the cabin, a gas turbine compressor assembly having a compressor inlet communicating with the cabin, said compressor assembly being provided with an outlet communicating with the inlet of said air cycle refrigeration assembly, means in said system for removing moisture from air therein, a second gas turbine compressor assembly having a compressor arranged to furnish combustion supporting air to both of the gas turbine compressor assemblies, whereby the compressor of the first mentioned gas turbine assembly may be entirely devoted to operation of the refrigeration assembly, first valve means intercommunicating with the compressor of said second gas turbine compressor and with the turbine of the first gas turbine compressor, second valve means adapted to divert compressed air from the first compressor to support combustion for operating the turbine thereof, whereby said gas turbine compressors may co-operate when providing refrigeration power or may operate independently for accomplishing other work, third valve means for shutting off flow from the cabin to the compressor inlet of the first gas turbine compressor, and for opening the same compressor inlet to atmosphere, and fourth valve means for shutting off flow from said first gas turbine compressor to said refrigeration assembly, and for diverting compressed air from said first compressor to a use location.

5. In a closed cycle refrigeration system for cooling aircraft cabins when on the ground, the combination of: a closed cabin, a refrigeration assembly having a cool air outlet communicating with the interior of said cabin, a compressor assembly having a compressor inlet communicating with said cabin, said compressor assembly having an outlet communicating with the inlet of said refrigeration assembly, means in said system for removing moisture from air therein, said system, including said cabin and said refrigeration assembly, being closed to outside atmosphere, a valve at the outlet of said compressor for diverting the flow of compressed air from said refrigeration assembly to a use location, and a second valve at the inlet of said compressor adapted to shut off the flow from said cabin thereto and to permit ambient air to enter said compressor.

6. A closed cycle refrigeration system for cooling an enclosure comprising: an air cycle refrigeration assembly consisting of a turbine and compressor mounted on a common shaft, the discharge of said compressor being connected to the inlet of said turbine, a second compressor unit, the inlet of said second compressor being connected to the enclosure, valve means mounted in the inlet connection of said second compressor for shutting off flow from the enclosure to said second compressor inlet and opening the same compressor inlet to the atmosphere, first conduit means connecting the discharge of said second compressor with the inlet of said first compressor, flow diverting means mounted in said first conduit means for diverting the discharge of said second compressor to a use location, second conduit means for connecting the discharge of said turbine with the enclosure and means mounted in said second conduit means for removing moisture from the air.

References Cited in the file of this patent

UNITED STATES PATENTS

| | | |
|---|---|---|
| 2,174,584 | Imus | Oct. 3, 1939 |
| 2,293,557 | Newton | Aug. 18, 1942 |
| 2,409,159 | Singleton | Oct. 8, 1946 |
| 2,485,522 | Andersen | Oct. 18, 1949 |
| 2,491,461 | Wood | Dec. 13, 1949 |
| 2,491,462 | Wood | Dec. 13, 1949 |
| 2,585,570 | Messinger | Feb. 12, 1952 |
| 2,622,406 | Scofield | Dec. 23, 1952 |